(12) United States Patent
Purohit et al.

(10) Patent No.: US 8,885,651 B2
(45) Date of Patent: Nov. 11, 2014

(54) COMMUNICATION DEVICE AND METHOD FOR RELEASING COMMUNICATION RESOURCES

(75) Inventors: Arvind Purohit, Bangalore (IN); Sudhir Pola, Bangalore (IN)

(73) Assignee: Intel Mobile Communications GmbH, Neubiberg (DE)

( * ) Notice: Subject to any disclaimer, the term of this patent is extended or adjusted under 35 U.S.C. 154(b) by 192 days.

(21) Appl. No.: 13/219,807

(22) Filed: Aug. 29, 2011

(65) Prior Publication Data

US 2013/0051333 A1 Feb. 28, 2013

(51) Int. Cl.
*H04L 12/28* (2006.01)
*H04W 4/00* (2009.01)
*H04W 76/06* (2009.01)

(52) U.S. Cl.
CPC .................................. *H04W 76/068* (2013.01)
USPC ........................ 370/395.2; 370/331; 709/228

(58) Field of Classification Search
None
See application file for complete search history.

(56) References Cited

U.S. PATENT DOCUMENTS

| 6,310,859 | B1 * | 10/2001 | Morita et al. ................. 370/235 |
| 6,601,099 | B1 * | 7/2003 | Corneliussen ................ 709/224 |
| 7,386,615 | B1 * | 6/2008 | Surlaker et al. ............... 709/226 |
| 7,599,478 | B2 * | 10/2009 | Cai et al. ................... 379/114.21 |
| 7,747,247 | B2 * | 6/2010 | Abdel-Kader ................ 455/421 |
| 2002/0045458 | A1 * | 4/2002 | Parantainen et al. ......... 455/466 |
| 2009/0092091 | A1 | 4/2009 | Balasubramanian |
| 2009/0305702 | A1 * | 12/2009 | Toppinen et al. .......... 455/435.2 |

FOREIGN PATENT DOCUMENTS

| EP | 2079173 A1 | 7/2009 |
| WO | 03/103159 A2 | 12/2003 |

OTHER PUBLICATIONS

RFC 3261, SIP: Session Initiation Protocol, [http://www.ietf.org/rfc/rfc3261.txt], J. Rosenberg et al., pp. 1-219.
3GPP TS 24.228, "3rd Generation Partnership Project; Technical Specification Group Core Network; Signalling flows for the IP multimedia call control based on SIP and SDP" (Release 5), pp. 1-653.
3GPP TS 23.060, "3rd Generation Partnership Project; Technical Specification Group Services and System Aspects; General Packet Radio Service (GPRS); Service description; Stage 2" (Release 9), pp. 1-297.
Nortel Networks: "Session Release Procedures", 3GPP Draft; 52-010793, 3rd Generation Partnership Project (3GPP), Mobile Competence Centre, Sophia-Antipolis Cedex, France, vol. SA WG2, 2001.
International Search report and Written Opinion received for PCT Application No. PCT/EP2012/064830, mailed on Oct. 11, 2012, 10 pages.

* cited by examiner

*Primary Examiner* — Ian N Moore
*Assistant Examiner* — Eric P Smith

(57) ABSTRACT

According to one embodiment, a communication device is described comprising a first determiner configured to determine a signal transmission time between the communication device and another communication device, wherein the communication device and the other communication device have a communication session with each other and communication resources are allocated for exchanging data in course of the communication session; a second determiner configured to determine a waiting period based on the determined signal transmission time; a transmitter configured to transmit a message indicating that the communication session is to be ended; and a controller configured to control the communication device to release the communication resources when the waiting period has elapsed since the transmitting of the message by the transmitter.

18 Claims, 6 Drawing Sheets

COMMUNICATION DEVICE AND METHOD FOR RELEASING COMMUNICATION RESOURCES

TECHNICAL FIELD

Embodiments generally relate to a communication device and a method for releasing communication resources.

BACKGROUND

The termination of a communication session is typically initiated by one of the communication terminals participating in the communication session. Since a message indicating that a communication session is to be ended sent by a first communication terminal to a second communication terminal needs a certain time to reach the second communication terminal, the second communication terminal may continue to send media data in context of the communication session although the first communication terminal already indicated that the communication session is to be ended. Therefore, efficient ways to end a communication session and to release the corresponding communication resources are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
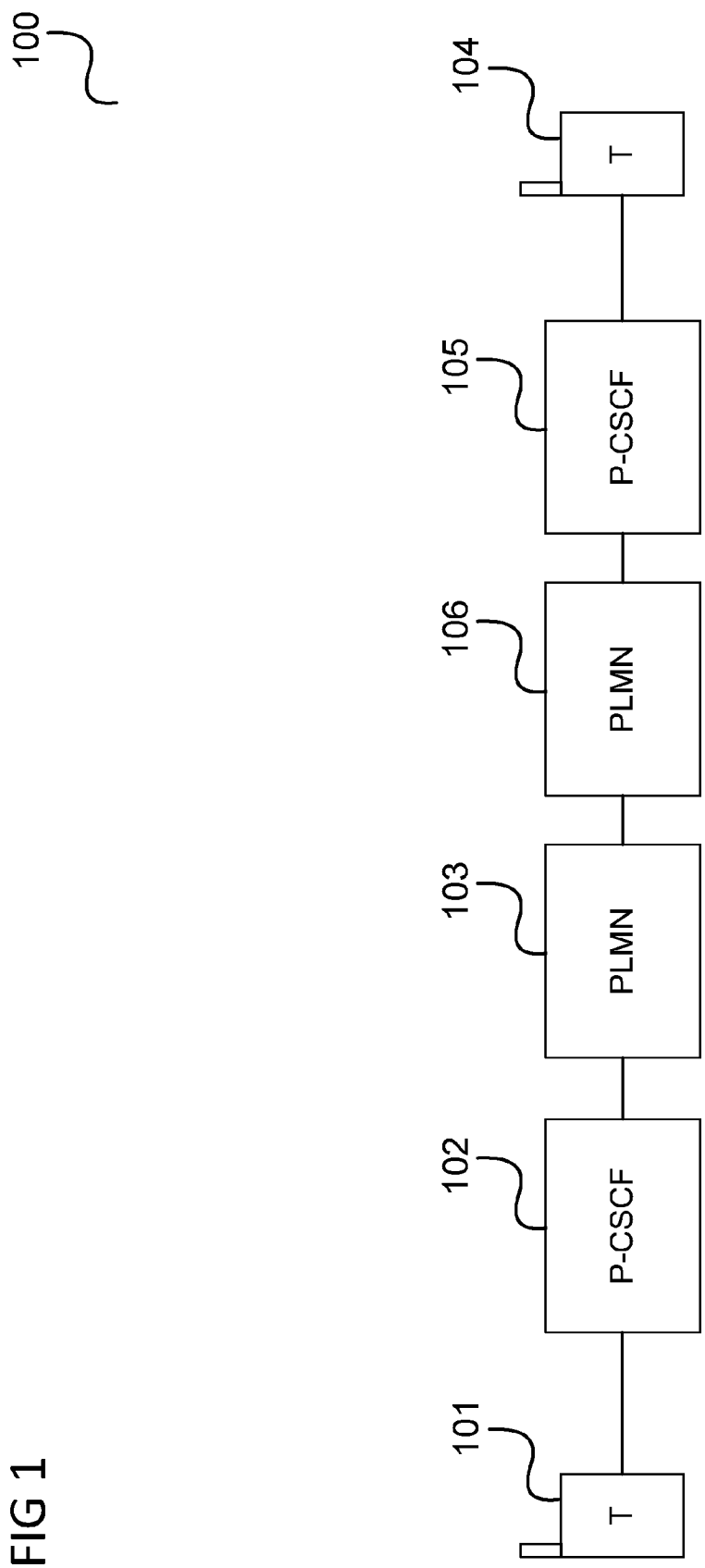
FIG. 1 shows a communication system according to an embodiment.

FIG. 1 shows a communication system 100 according to an embodiment.

The communication system 100 is an Internet Protocol Multimedia Subsystem (IMS) communication system, i.e., a communication system based on the IMS framework. It includes a first communication terminal 101, in other words an end device, for example a mobile terminal and a first Proxy-Call Session Control Function (P-CSCF) 102 via which the first communication terminal 101 is connected to its home network 103, e.g., its home Public Land Mobile Network (PLMN). Similarly, the communication system 100 includes a second communication terminal 104 and a second Proxy-Call Session Control Function P-CSCF 105 via which the second communication terminal 104 is connected to its home network 106, e.g., its home PLMN.

The home network 103 and the home network 106 may be connected to each other or may even be the same network, e.g., the same PLMN.

The home networks 103, 104 may include IMS network components like an Interrogating CSCF (I-CSCF) and an Serving CSCF (S-CSCF).

The IMS framework can be seen as an architectural framework for the convergence of data, speech, fixed and mobile networks and is based on a wide range of protocols, most of which have been developed by Internet Engineering Task Force (IETF) The IMS framework combines and enhances these protocols to allow real-time services on top of cellular packet communication networks. IMS transforms the best effort IP network by introducing end-to-end Quality of Service (QoS) guarantee, which is realized through a resource reservation.

According to one embodiment, IMS services are provided based on a cellular packet data communication network, in which the communication resources provided for communication sessions (e.g. for IMS communication sessions) are Packet Data Protocol (PDP) contexts. Two types of PDP contexts are typically defined in such a cellular packet data network, namely primary PDP contexts and secondary PDP contexts. A primary PDP context is used for generic data transfer without any QoS requirement. Secondary PDP contexts guarantee a certain QoS and may for example be used for transmitting media like audio data, video data etc.

Typically, there are four classes of QoS which can be used for a secondary PDP context. They are
Conversational (for applications like VoIP, Video Telephony),
Streaming (for applications like Video sharing, Push to Talk)
Interactive (for applications like chat) and
Background (for browsing or file download).

With the fast convergence towards packet data communication networks, circuit switched voice calls will presumably be replaced by IMS Voice over IP (VoIP) and similarly Video Telephony calls will presumably be replaced by IMS Video Telephony (VT) in the future. The primary requirement for IMS service calls (i.e., IMS voice or video telephony communication sessions) can be seen in matching the user experience of circuit switched voice calls in terms of audio quality. To achieve this, a dedicated (secondary) PDP context guaranteeing the required QoS needs to be requested by a communication terminal initiating an IMS service call. The conversational class QoS can be used to fulfill the IMS VoIP/VT requirements. Since the dedicated PDP context is typically a scarce resource on the communication network, it is mandated according to the IMS framework that a communication terminal releases the secondary PDP context on the termination of a IMS service call.

According to one embodiment, in accordance with IMS, call setup and call release is done using Session Initiation Protocol (SIP) messages. These messages are transferred over a primary PDP context. IMS VoIP/VT media is transmitted according to the Real-Time Transport Protocol (RTP) and the media is transferred over a dedicated (secondary) PDP context.

Figure 2:
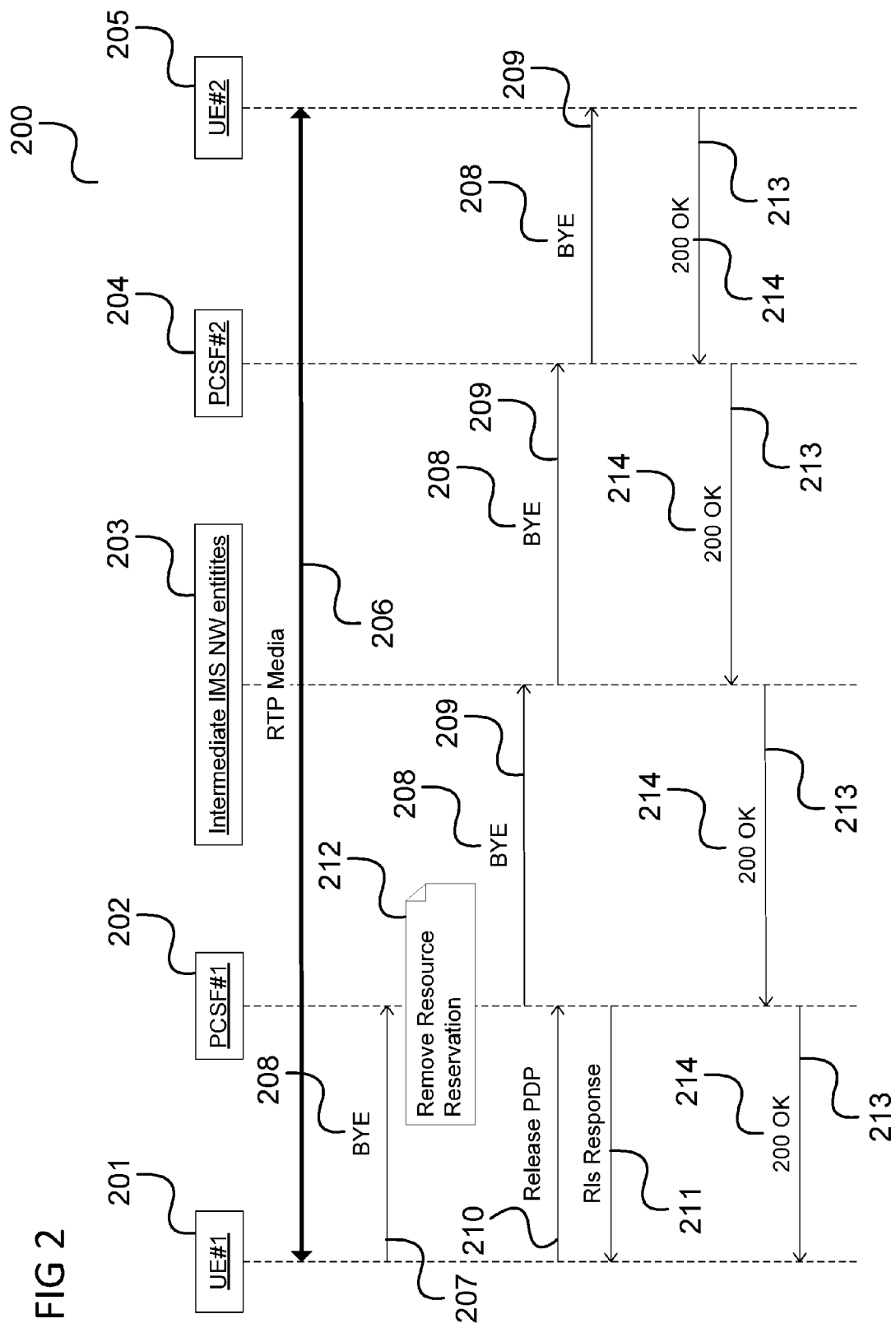
FIG. 2 shows a message flow diagram according to an embodiment.

A communication session may be terminated by a communication terminal in accordance with the $3^{rd}$ Generation Partnership Project (3GPP) standard as illustrated in FIG. 2.

FIG. 2 shows a message flow diagram 200 according to an embodiment.

The message flow takes place between a first communication terminal 201, for example corresponding to the first communication terminal 101, a first P-CSCF 202, for example corresponding to the first P-CSCF 102, a second P-CSCF 204, for example corresponding to the second P-CSCF 105, a second communication terminal 205, for example corresponding to the second communication terminal 104 and intermediate IMS network components (or entities) 203 which for example include components of the home PLMN of the first communication terminal 201 or the home PLMN of the second communciation terminal 205, such as an I-CSCF or an S-CSCF.

It is assumed that in 206, media data such as voice data or video data are exchanged between the first communication terminal 201 and the second communication terminal 205 in accordance with the RTP in course of an IMS communication session between the first communication terminal 201 and the second communication terminal 205.

In 207, the first communication terminal 201 sends a SIP BYE message 208 to the first P-CSCF 202 to terminate the communication session. In 209, the SIP BYE message 208 is forwarded via the intermediate IMS network components 203 and the second P-CSCF 204 to the second communication terminal 205.

In 210, the first communication terminal 201 initiates the release of the bearer PDP i.e., the dedicated (secondary) PDP context used for the communication session (in other words allocated for the communication session) and signals to the first P-CSCF 202 that the dedicated PDP context should be released. This is confirmed by the first P-CSCF 202 in 211 and the PDP context is released by the underlying communication network, e.g., a General Packet Radio System (GPRS) subsystem. For example, the IP network resources that had been reserved for the message receive path to the first communication terminal 201 for the communication session are released, for example upon initiation by a Gateway GPRS support node (GSGN).

In 212, which may be carried out in parallel to 210 and 211, the first P-CSCF 202 removes the authorization for communication resources that had previously been issued for the first communication terminal 201.

In 213, the second communciation terminal 205 transmits a SIP 200 OK message 214 via the second P-CSCF 204, the intermediate IMS network components 203 and the first P-CSCF 202 to the first communication terminal 201 and thus confirms the termination of the communication session.

The dedicated PDP context allocated for the communication session may be released after sending the BYE messsage 208 or even before sending the BYE message 208. This may result in a network behaviour as illustrated in FIG. 3.

Figure 3:
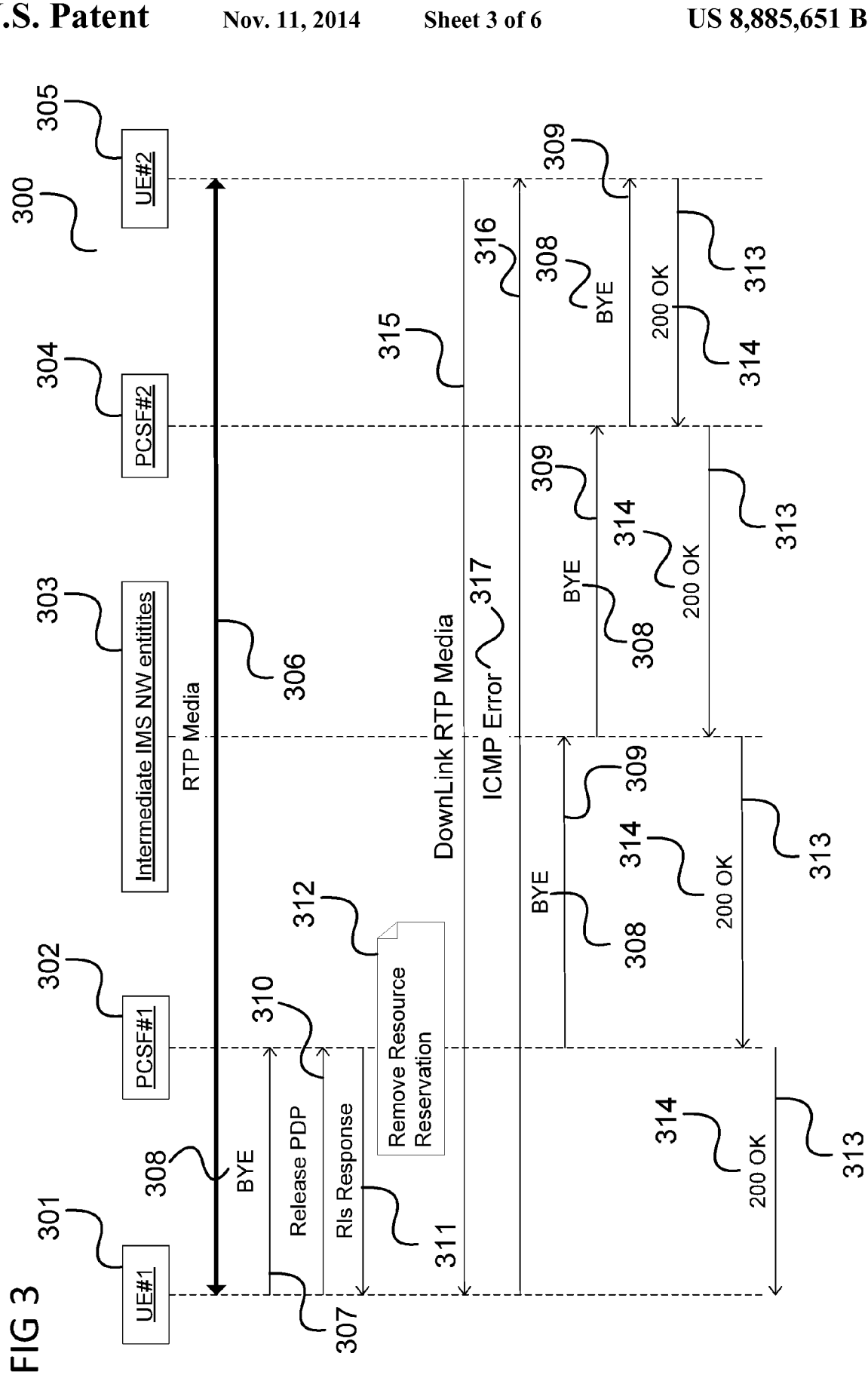
FIG. 3 shows a message flow diagram according to an embodiment.

FIG. 3 shows a message flow diagram 300 according to an embodiment.

Corresponding to FIG. 2, the message flow takes place between a first communication terminal 301, a first P-CSCF 302, a second P-CSCF 304, a second communication terminal 305 and intermediate IMS network components (or entities) 303.

Similarly to the message flow illustrated in FIG. 2, it is assumed that in 306, media data are exchanged in course of a communication session between the first communication terminal 301 and the second communication terminal 305 in accordance with the RTP. In 307, a BYE message 308 is sent by the first communication terminal 301 via the first P-CSCF 302, the intermediate IMS network entities 303 and the second P-CSCF 304 to the second communication terminal 305 which is confirmed in 313 by means of a 200 OK message 314.

In this example it is assumed that the PDP context allocated for the communication session is released (upon initiation by the first communication terminal 301 in 310 and confirmed by the first P-CSCF 302 in 311) and the communication resource reservation is removed in 312 before the sending of the BYE message 308 or immediately after the sending of the BYE message 308.

Therefore, in 315, the second communication terminal 305 continues sending media data until it has received the BYE message 308. Thus, the media data is present in the communication network (i.e., in the P-CSCFs 203, 204 and the intermediate IMS network components) which tries to forward the media data to the first communication terminal 301. Since the first communication terminal 301 already has already initiated the release of the secondary PDP context and has carried out corresponding actions on his side (e.g., has closed the media ports allocated to the communication session) each media packet forwarded to the first communication terminal 301 is in 316 answered with an Internet Control Message Protocol (ICMP) error message 317, e.g., by the components of the first communication terminal 301 implementing the IP stack. Further, since at this point the secondary PDP context previously allocated for the communication session is no longer present all the media and ICMP error messages 317 are in this example, according to 3GPP, transferred on the primary PDP context.

Accordingly, SIP messages which are transferred on the primary PDP context may be delayed due to the higher load of the primary PDP context. This may further delay the transmission of SIP BYE messages which may thus lead to even longer periods during which, due to an already released PDP context, ICMP error messages are sent in response to media packets.

Further, for example a subsequent VoIP call setup message by the first communication terminal 301 might get delayed or dropped as the primary PDP context is loaded with the RTP packets and the ICMP error messages 317. This may lead to Denial of Service (DoS) for a few seconds for the first communication terminal 301, as there may be stray message packets in the network.

The effects described above with reference to FIG. 3 can be expected to be stronger the lower the bandwidth of the connection of the first communication terminal 301 to the network is. For example, for a satellite VoIP phone the bandwidth to the network may be less than 2 kbps. Thus, the BYE message 308 may take a few seconds to reach the network (and eventually the second communication terminal 305) so for those few seconds the second communication terminal 305 would keep sending media data towards the first communication terminal 301 and the network would forward this media data.

Table 1 gives an illustration of how much time it would get for a BYE message from a first communication terminal (UE#1) to reach an IMS network, specifically a first P-CSCF (PCSCF #1), and another communication terminal (UE#2) via a second P-CSCF (P-CSCF #2). In these examples, it is assumed that the PCSCFs in the IMS network are linked with high speed networks and message transmission time between the PCSCFs is negligible.

TABLE 1

Message flow times on a low bandwidth network.

| Message direction | Average SIP BYE message Size | Transmission time (1.6 kbps bandwidth) | Transmission time (3.2 kbps bandwidth) |
|---|---|---|---|
| From UE#1 to PCSCF#1 | 1000 Bytes | 5 Seconds | 2.5 Seconds |
| From PCSCF#2 to UE#2 | 1000 Bytes | 5 Seconds | 2.5 Seconds |

As can be seen, ICMP packets may be sent in response to media packets for 5 seconds on a network where the communication terminals are connected to the network with a bandwidth of 1.6 kbps.

Thus, the call release procedure described above with reference to FIGS. 2 and 3 can clog the network (e.g. a cellular IP network) due to generation of error packets. This may be more relevant on low bandwidth cellular IP networks like satellite networks.

Accordingly, according to one embodiment, an optimized way for session termination is provided, e.g. for the release of an IMS call (e.g. an IMS VoIP call) using primary and secondary PDP contexts. With embodiments providing an optimized way to terminate sessions, e.g. IMS (IP Multimedia Subsystem) based service calls like VoIP, Video Telephone (VT) etc. used by IMS clients running on cellular terminals (e.g. User Equipments, UEs) clogging in the network at the call termination (e.g. by RTP media packets and ICMP error packets) can be avoided or at least reduced, it can be avoided that a communication terminal (e.g. a VoIP terminal) is out of reach for few seconds after call termination for subsequent IMS services (which may happen due to clogging especially in low bandwidth IP networks) and unwanted error packets (e.g. ICMP packets) flowing in the network on call termination can be avoided.

Figure 4:
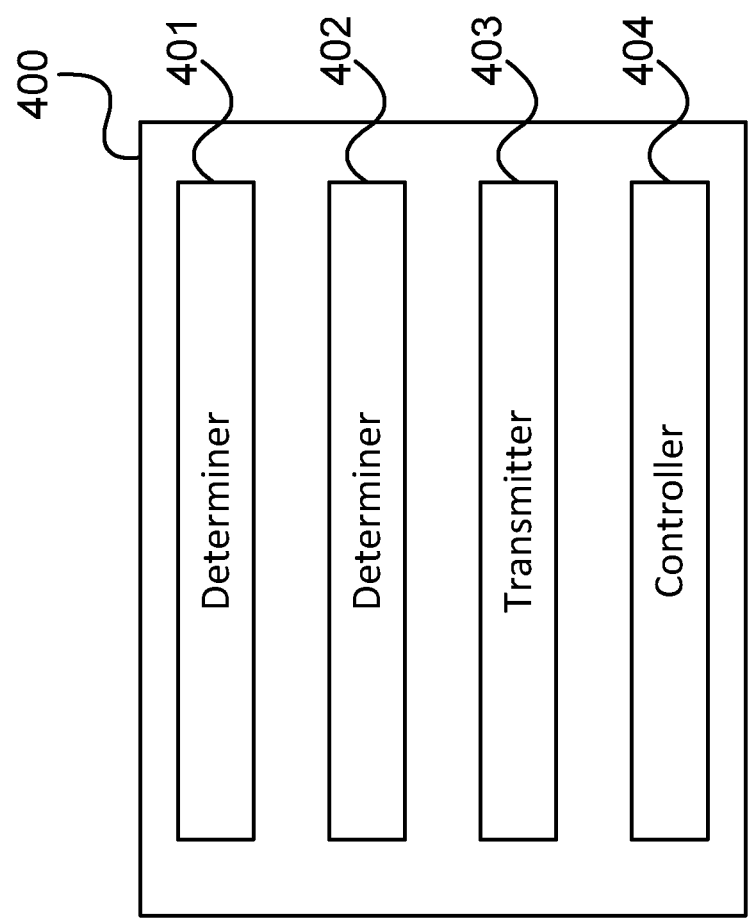
FIG. 4 shows a communication device according to an embodiment.

A communication device according to one embodiment is shown in FIG. 4.

FIG. 4 shows a communication device 400 according to an embodiment.

The communication device 400 includes a first determiner 401 (i.e. for example a determining circuit) configured to determine a signal transmission time between the communication device and another communication device, wherein the communication device 400 and the other communication device have a communication session with each other and communication resources are allocated for exchanging data in course of the communication session.

The communication device 400 further includes a second determiner 402 configured to determine a waiting period based on the determined signal transmission time.

The communication device 400 further includes a transmitter 403 configured to transmit a message indicating that the communication session is to be ended;

Additionally, the communication device 400 includes a controller 404 configured to control the communication device 400 to release the communication resources when the waiting period has elapsed since the transmitting of the message by the transmitter 403.

According to one embodiment, in other words, a (first) communication device waits until another (i.e., second) communication device can be expected to have received a session termination message to terminate a session between the communication device and the other communication device before releasing the communication resources that have been allocated for the participation of the (first) communication device in the communication session. The releasing of the communication resources may include one or more of releasing communication resources locally at the communication device (e.g., closing media ports), releasing network communication resources (e.g., a communication channel) and signaling to a network component that communication sessions (e.g., communication channels) no longer have to be allocated to the communication session and/or the communication device can be re-allocated.

It should be noted that the other (second) communication device does not necessarily need to be a communication terminal but may be a network component forwarding data from a third communication device (e.g. a communication terminal) to the first communication device and vice versa. In other words, the other (second) communication device may work as a relay node between the first communication device and a third communication device. For example, the first communication device may have a communication session with a third communication device via the second communication device which forwards data exchanged between the first communication device and the third communication device. The communication session between the first communication device and the second communication device may thus refer to a communication connection for transmitting forwarded data or transmitting data to be forwarded. Accordingly, the message indicating that the communication session is to be ended may be a message directed to the third communication device to indicate that the communication session between the first communication device and the third communication device is to be ended. Nevertheless, this message can also be seen to indicate that the communication session between the first communication device and the second communciation device is to be ended.

The communication device may further include a detector configured to detect whether the waiting period has elapsed since the transmitting of the message by the transmitter, wherein the controller is configured to control the communication device to release the communication resources when it is detected that the waiting period has elapsed since the transmitting of the message by the transmitter.

According to one embodiment, the controller is configured to control the communication device to keep the communication resources allocated for the communication session when the waiting period has not yet elapsed since the transmitting of the message by the transmitter.

According to one embodiment, the controller is configured to control the communication device to continue receiving media data transmitted by the other communication device to the communication device when the waiting period has not yet elapsed since the transmitting of the message by the transmitter.

According to one embodiment, the controller is configured to control the communication device to stop receiving media data transmitted by the other communication device to the communication device when the waiting period has elapsed since the transmitting of the message by the transmitter.

According to one embodiment, the controller is configured to control the communication device to keep the communication session between the communication device and the other communication device established when the waiting period has not yet elapsed since the transmitting of the message by the transmitter.

According to one embodiment, the controller is configured to control the communication device to release the communication session between the communication device and the other communication device established when the waiting period has elapsed since the transmitting of the message by the transmitter.

The signal transmission time is for example the time required for a signaling information sent by the communication device to reach the other communication device.

According to one embodiment, the second determiner is configured to use the signal transmission time as the waiting period. In other words, the second determiner may be configured to interpret the signal transmission time as the waiting period, i.e. the determination by the second determiner may be a reinterpretation of the signal transmission time as the waiting period.

According to one embodiment, the first determiner is configured to determine an expected amount of time that it is necessary for a session end message sent by the communication device to reach the other communication device as the signal transmission time.

According to one embodiment, the controller is configured to control the communication device to release the communication resources when the waiting period has elapsed since the transmitting of the message by the transmitter such that media data can no longer be received by the communication device from the other communication device in context of the communication session.

According to one embodiment, the communication resources include at least one of a PDP context and a media port.

According to one embodiment, the communication session is an IMS communication session.

According to one embodiment, the message is a message according to the SIP protocol.

According to one embodiment, the first determiner is configured to determine the signal transmission time based on the round trip time between the communication device and the other communication device.

According to one embodiment, the first determiner is configured to determine the signal transmission time as half the round trip time between the communication device and the other communication device.

According to one embodiment, the first determiner is further configured to determine the round trip time between the communication device and the other communication device.

The round trip time is for example the round trip time of a control signaling between the communication device and the other communication device.

The control signaling is for example control signaling according to the SIP protocol.

According to one embodiment, the second determiner determines the waiting period to include a majority (e.g. more than 50% or more than 80%) of the signal transmission time.

According to one embodiment, the first communication device and/or second communication device are communication terminals.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 5:
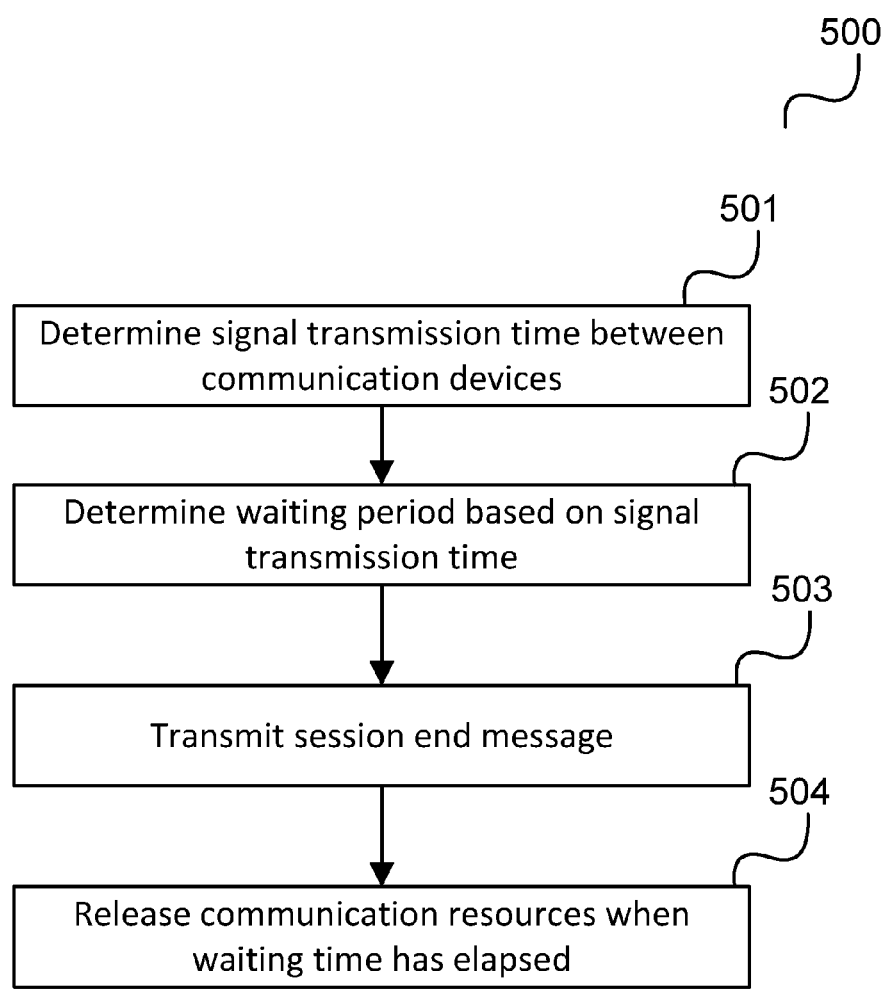
FIG. 5 shows a flow diagram according to an embodiment.

According to one embodiment, the communication device 400 carries out a method as illustrated in FIG. 5.

FIG. 5 shows a flow diagram 500 according to an embodiment.

The flow diagram 500 illustrates a method for releasing communication resources.

In 501, a signal transmission time between a communication device and another communication device is determined, wherein the communication device and the other communication device have a communication session with each other and communication resources are allocated for exchanging data in course of the communication session.

In 502, a waiting period is determined based on the determined signal transmission time.

In 503, a message is transmitted indicating that the communication session is to be ended.

In 504, the communication device is controlled to release the communication resources when the waiting period has elapsed since the transmitting of the message by the transmitter.

It should be noted that embodiments described in context with the method illustrated in FIG. 5 are analogously valid for the communication device 400 and vice versa.

In the following, an embodiment is described based on the IMS architecture as illustrated in FIG. 1. According to one embodiment, in accordance with SIP, a timer with a time value of T1, which represents the round trip time between the first communication terminal 101 and the second communication terminal 104 is defined. T1 gives the time between the sending of a SIP message from the first communication terminal 101 to the second communication terminal 105 and the reception of the corresponding response message by the first communication terminal 101.

According to one embodiment, the first communication terminal 101 waits after sending a BYE message to the second communication terminal 104 to end a communication session between the first communiation terminal 101 and the second communication terminal 104 (e.g. to release a call between the first communiation terminal 101 and the second communication terminal 104) for a time of T½ (i.e. half of the round trip time) before it releases the secondary PDP context used for the communication session and before it closes the RTP media ports used for the communication session. In best case, the time T½ can be expected to ensure that the SIP BYE reaches the second communication terminal 105 before the PDP context is released and the RTP media ports are closed. When the time of T½ after the sending of the BYE message has expiered, the secondary PDP context is released (e.g. the first communication terminal 101 initiates release of the PDP context other corresponding communication resources such as IP network resources) and the first communication terminal 101 closes the media ports allocated for the communication session.

As T1 is the estimate of round trip time under ideal physical network conditions any SIP message should reach the IMS network and the second communication terminal 104 after T½. Once the second communication device 105 receives the SIP BYE message it stops the media flow towards the first communication terminal 101. Accordingly, according to one embodiment, the first communication device 101 delays the release of the secondary PDP context release by T½.

An embodiment is described in more detail in the following with reference to FIG. 6.

Figure 6:
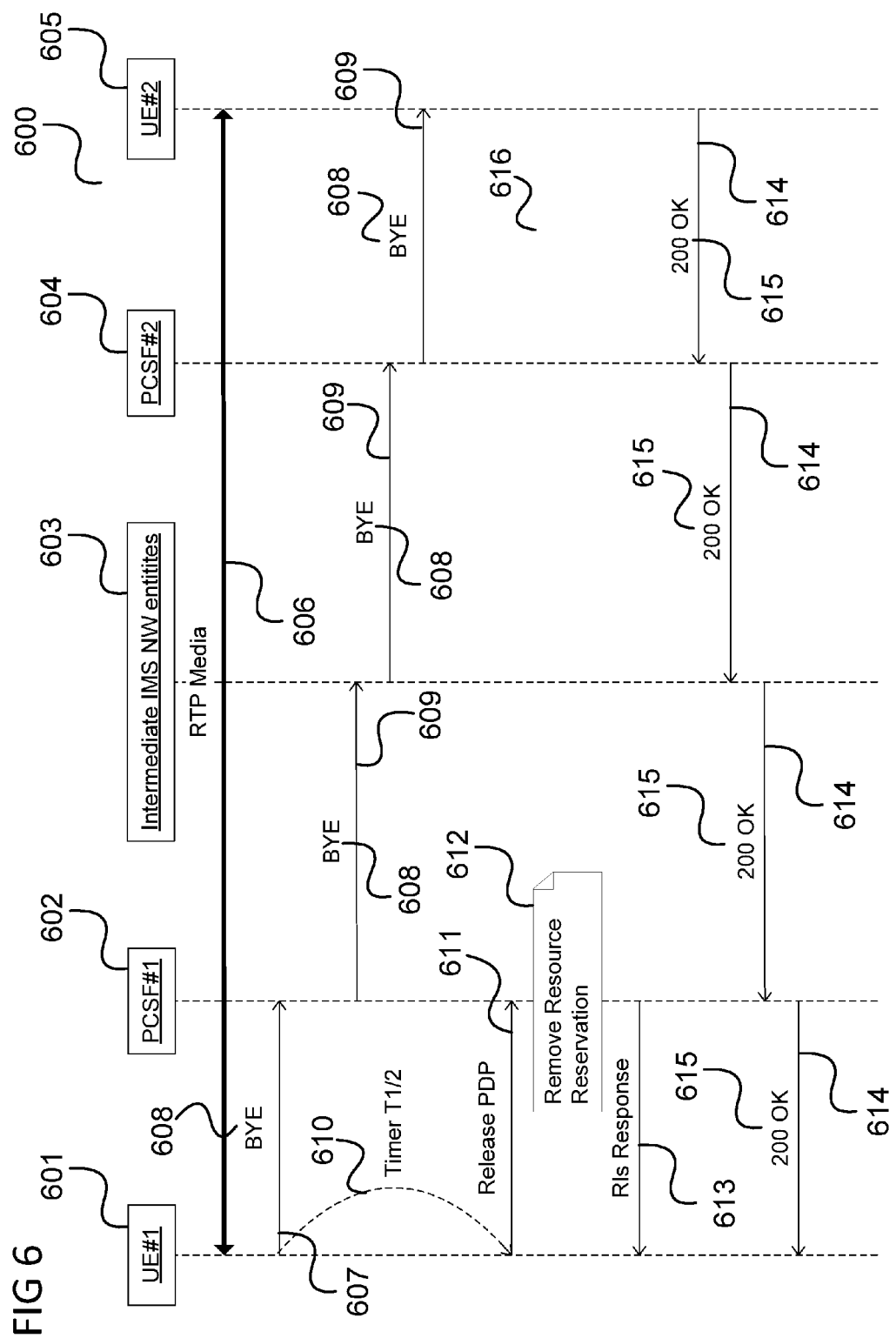
FIG. 6 shows a flow diagram according to an embodiment.

FIG. 6 shows a flow diagram 600 according to an embodiment.

The message flow takes place between a first communication terminal 601, for example corresponding to the first communication terminal 101, a first P-CSCF 602, for example corresponding to the first P-CSCF 102, a second P-CSCF 604, for example corresponding to the second P-CSCF 105, a second communication terminal 605, for example corresponding to the second communication terminal 104 and intermediate IMS network components (or entities) 603 which for example include components of the home PLMN of the first communication terminal 601 or the home PLMN of the second communciation terminal 605, such as an I-CSCF or an S-CSCF.

It is assumed that in 606, media such as voice data or video data is exchanged between the first communication terminal 601 and the second communication terminal 605 in accordance with the RTP in course of an IMS communication session between the first communication terminal 601 and the second communication terminal 605.

In 607, the first communication terminal 601 sends a SIP BYE message 608 to the first P-CSCF 602 to terminate the communication session. In 609, the SIP BYE message 608 is forwarded via the intermediate IMS network components 603 and the second P-CSCF 604 to the second communication terminal 605.

It is assumed that the first communication terminal 601 has determined the round trip time T1 between the first communication terminal 601 and the second communication terminal 605.

The first communication terminal 601 does not immediately release the secondary PDP context used for the communication session and does not immediatley close the media ports used for the communication session after sending the BYE message 608, but waits for a time of T½ (also referred to as waiting period) in 610. During this period, since the secondary PDP context associated with the commucation session is still open (i.e. established and allocated to the communication session), the media data sent by the second communication terminal 605 in context of the communication session is transmitted via the secondary PDP context to the first communication terminal 601. Since further the media ports associated with the communication session are still open, the media data (i.e. RTP packets) can be received by the first communication terminal 601. The first communication terminal 601 for example drops these RTP packets (e.g. does not output them to the user any more).

In 611, after the waiting period has elapsed, the first communication terminal 601 initiates the release of the bearer PDP i.e. the dedicated (secondary) PDP context used for the communication session (in other words allocated for the communication session) and signals to the first P-CSCF 602 that the dedicated PDP context should be released. The first communication terminal 601 releases the PDP context and closes the media ports associated with the communication session.

In 612, the first P-CSCF 602 removes the authorization for communication resources that had previously been issued for the first communication terminal 601.

The release of the PDP context is confirmed by the first P-CSCF 602 in 613 and the PDP context is released by the underlying communication network, e.g. a GPRS (General Packet Radio System) subsystem. For example, the IP network resources that had been reserved for the message receive path to the first communication terminal 601 for the communication session are released, for example upon initiation by a Gateway GPRS support node (GSGN).

In 614, after having received the BYE message 608, the second communciation terminal 605 transmits a SIP 200 OK message 615 via the second P-CSCF 604, the intermediate IMS network components 603 and the first P-CSCF 602 to the first communication terminal 601.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
   a first determiner configured to determine a signal transmission time between the communication device and another communication device, wherein the communication device and the other communication device have a communication session with each other and communication resources are allocated for exchanging data during the communication session and wherein the signal transmission time is a time required for a signaling information sent by the communication device to reach the other communication device;
   a second determiner configured to determine a waiting period based on the determined signal transmission time;
   a transmitter configured to transmit a Session Initiation Protocol (SIP) BYE message indicating that the communication session is to be ended;
   a detector configured to detect whether a time elapsing since the transmitting of the SIP BYE message by the transmitter has exceeded the determined waiting period; and
   a controller configured to control the communication device to release the communication resources when and in response to the detector detecting that the time elapsing since the transmitting of the SIP BYE message by the transmitter has exceeded the determined waiting period,
   wherein the communication device and the other communication device are communication terminals.

2. The communication device according to claim 1, wherein the controller is configured to control the communication device to keep the communication resources allocated for the communication session when the time elapsing since the transmitting of the SIP BYE message by the transmitter has not yet exceeded the determined waiting period.

3. The communication device according to claim 1, wherein the controller is configured to control the communication device to continue receiving media data transmitted by the other communication device to the communication device when the time elapsing since the transmitting of the SIP BYE message by the transmitter has not yet exceeded the determined waiting period.

4. The communication device according to claim 1, wherein the controller is configured to control the communication device to stop receiving media data transmitted by the other communication device to the communication device when the time elapsing since the transmitting of the SIP BYE message by the transmitter has exceeded the determined waiting period.

5. The communication device according to claim 1, wherein the controller is configured to control the communication device to keep the communication session between the communication device and the other communication device established when the time elapsing since the transmitting of the SIP BYE message by the transmitter has not yet exceeded the determined waiting period.

6. The communication device according to claim 1, wherein the controller is configured to control the communication device to release the communication session between the communication device and the other communication device established when the time elapsing since the transmitting of the SIP BYE message by the transmitter has exceeded the determined waiting period.

7. The communication device according to claim 1, wherein the second determiner is configured to use the signal transmission time as the waiting period.

8. The communication device according to claim 1, wherein the first determiner is configured to determine an expected amount of time necessary for a session end message sent by the communication device to reach the other communication device as the signal transmission time.

9. The communication device according to claim 1, wherein the controller is configured to control the communication device to release the communication resources when the time elapsing since the transmitting of the SIP BYE message by the transmitter has exceeded the determined waiting period such that media data can no longer be received by the communication device from the other communication device during the communication session.

10. The communication device according to claim 9, wherein the second determiner determines the waiting period to include a majority of the signal transmission time.

11. The communication device according to claim 1, wherein the communication resources include at least one of a Packet Data Protocol (PDP) context and a media port.

12. The communication device according to claim 1, wherein the communication session is an Internet Protocol Multimedia Subsystem (IMS) communication session.

13. The communication device according to claim 1, wherein the first determiner is configured to determine the signal transmission time based on a round trip time between the communication device and the other communication device.

14. The communication device according to claim 13, wherein the first determiner is configured to determine the signal transmission time as half the round trip time between the communication device and the other communication device.

15. The communication device according to claim 13, wherein the first determiner is further configured to determine the round trip time between the communication device and the other communication device.

16. The communication device according to claim 13, wherein the round trip time is a round trip time of a control signaling between the communication device and the other communication device.

17. The communication device according to claim 16, wherein the control signaling is control signaling according to the SIP protocol.

18. A method for releasing communication resources comprising:
    determining a signal transmission time between a communication device and another communication device, wherein the communication device and the other communication device have a communication session with each other and the communication resources are allocated for exchanging data during the communication session and wherein the signal transmission time is a time required for a signaling information sent by the communication device to reach the other communication device;
    determining a waiting period based on the determined signal transmission time;
    transmitting a Session Initiation Protocol (SIP) BYE message indicating that the communication session is to be ended;
    detecting whether a time elapsing since the transmitting of the SIP BYE message has exceeded the determined waiting period; and
    controlling the communication device to release the communication resources when and in response to detecting that the time elapsing since the transmitting of the SIP BYE message has exceeded the determined waiting period.

* * * * *